US007275083B1

(12) United States Patent
Seibel et al.

(10) Patent No.: US 7,275,083 B1
(45) Date of Patent: *Sep. 25, 2007

(54) WEB-BASED CUSTOMER LEAD GENERATOR SYSTEM WITH PRE-EMPTIVE PROFILING

(75) Inventors: John C. Seibel, Austin, TX (US); Yu Feng, Bayside, NY (US); Robert L. Foster, Austin, TX (US)

(73) Assignee: ReachForce, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/276,743

(22) Filed: Mar. 13, 2006

Related U.S. Application Data (63) Continuation of application No. 09/970,563, filed on Oct. 4, 2001, now Pat. No. 7,043,531.

(60) Provisional application No. 60/238,094, filed on Oct. 4, 2000.

(51) Int. Cl.
G06F 15/16 (2006.01)
G06F 17/30 (2006.01)

(52) U.S. Cl. .................. 709/206; 709/204; 705/10; 705/14; 707/3; 707/6; 707/10

(58) Field of Classification Search ............... 709/209, 709/204, 203; 705/10, 14; 707/3, 6, 10
See application file for complete search history.

(56) References Cited

U.S. PATENT DOCUMENTS

| | | | |
|---|---|---|---|
| 4,914,586 | A | 4/1990 | Swinehart et al. |
| 5,619,648 | A | 4/1997 | Canale et al. |
| 5,630,121 | A | 5/1997 | Braden-Harder et al. |
| 5,649,114 | A | 7/1997 | Deaton et al. |
| 5,659,469 | A | 8/1997 | Deaton et al. |
| 5,787,422 | A | 7/1998 | Tukey et al. |
| 5,809,481 | A | 9/1998 | Baron et al. |
| 5,897,622 | A | 4/1999 | Blinn et al. |
| 5,924,068 | A | 7/1999 | Richard et al. |
| 5,924,105 | A | 7/1999 | Punch, III et al. |

(Continued)

FOREIGN PATENT DOCUMENTS

EP 1118952 7/2001

(Continued)

OTHER PUBLICATIONS

Paul Dean; "Browsable OLAP apps on SQL server analysis services"; intelligent enterprise magazine, product review, May 7, 2001, 5 pages.

(Continued)

*Primary Examiner*—Ario Etienne
*Assistant Examiner*—Sahera Halim (57) ABSTRACT

A web-based customer lead generator system. The system is based on an application service model, with the programming for the system being accessible to users of the system via web browsers and the Internet. The users are typically business enterprises that maintain e-commerce web sites. The pre-emptive profiling process searches the Internet to obtain email addresses of potential web site buyers. It performs a reverse look-up process to obtain demographic data about each potential buyer. This data is used to provide a purchasing profile of the buyer, which is then forwarded to the e-commerce business enterprise.

23 Claims, 9 Drawing Sheets

U.S. PATENT DOCUMENTS

| | | | |
|---|---|---|---|
| 5,931,907 A | 8/1999 | Davies et al. |
| 5,948,061 A | 9/1999 | Merriman et al. |
| 5,974,398 A | 10/1999 | Hanson et al. |
| 5,986,690 A | 11/1999 | Hendricks |
| 5,987,247 A | 11/1999 | Lau |
| 5,999,927 A | 12/1999 | Tukey et al. |
| 6,006,242 A | 12/1999 | Poole et al. |
| 6,026,433 A | 2/2000 | D'Arlach et al. |
| 6,029,141 A | 2/2000 | Bezos et al. |
| 6,029,164 A | 2/2000 | Birrell et al. |
| 6,029,174 A | 2/2000 | Sprenger et al. |
| 6,029,195 A | 2/2000 | Herz |
| 6,034,970 A | 3/2000 | Levac et al. |
| 6,055,510 A | 4/2000 | Henrick et al. |
| 6,058,375 A | 5/2000 | Park |
| 6,058,398 A | 5/2000 | Lee |
| 6,058,418 A | 5/2000 | Kobata |
| 6,078,891 A | 6/2000 | Riordan et al. |
| 6,105,055 A | 8/2000 | Pizano et al. |
| 6,119,101 A | 9/2000 | Peckover |
| 6,134,548 A | 10/2000 | Gottsman et al. |
| 6,145,003 A | 11/2000 | Sanu et al. |
| 6,148,289 A | 11/2000 | Virdy |
| 6,151,582 A | 11/2000 | Huang et al. |
| 6,151,601 A | 11/2000 | Papierniak et al. |
| 6,154,766 A | 11/2000 | Yost et al. |
| 6,170,011 B1 | 1/2001 | Macleod Beck et al. |
| 6,199,081 B1 | 3/2001 | Meyerzon et al. |
| 6,202,210 B1 | 3/2001 | Ludtke |
| 6,205,432 B1 | 3/2001 | Gabbard et al. |
| 6,212,178 B1 | 4/2001 | Beck et al. |
| 6,226,623 B1 | 5/2001 | Schein et al. |
| 6,233,575 B1 | 5/2001 | Agrawal et al. |
| 6,236,975 B1 | 5/2001 | Boe et al. |
| 6,249,764 B1 | 6/2001 | Kamae et al. |
| 6,256,623 B1 | 7/2001 | Jones |
| 6,262,987 B1 | 7/2001 | Mogul |
| 6,263,334 B1 | 7/2001 | Fayyad et al. |
| 6,282,548 B1 | 8/2001 | Burner et al. |
| 6,289,342 B1 | 9/2001 | Lawrence et al. |
| 6,297,819 B1 | 10/2001 | Furst |
| 6,332,154 B2 | 12/2001 | Beck et al. |
| 6,338,066 B1 | 1/2002 | Martin et al. |
| 6,345,288 B1 | 2/2002 | Reed et al. |
| 6,363,377 B1 | 3/2002 | Kravets et al. |
| 6,370,508 B2 | 4/2002 | Beck et al. |
| 6,377,993 B1 | 4/2002 | Brandt et al. |
| 6,381,599 B1 | 4/2002 | Jones et al. |
| 6,393,465 B2 | 5/2002 | Leeds |
| 6,401,091 B1 | 6/2002 | Butler et al. |
| 6,401,118 B1 | 6/2002 | Thomas |
| 6,405,197 B2 | 6/2002 | Gilmour |
| 6,430,545 B1 | 8/2002 | Honarvar et al. |
| 6,430,624 B1 | 8/2002 | Jamtgaard et al. |
| 6,434,544 B1 | 8/2002 | Bakalash et al. |
| 6,434,548 B1 | 8/2002 | Emens et al. |
| 6,438,543 B1 | 8/2002 | Kazi et al. |
| 6,460,038 B1 | 10/2002 | Khan et al. |
| 6,460,069 B1 | 10/2002 | Berlin et al. |
| 6,473,756 B1 | 10/2002 | Ballard |
| 6,477,536 B1 | 11/2002 | Pasumansky et al. |
| 6,480,842 B1 | 11/2002 | Agassi et al. |
| 6,480,885 B1 | 11/2002 | Olivier |
| 6,490,582 B1 | 12/2002 | Fayyad et al. |
| 6,490,620 B1 | 12/2002 | Ditmer et al. |
| 6,493,703 B1 | 12/2002 | Knight et al. |
| 6,510,432 B1 | 1/2003 | Doyle |
| 6,516,337 B1 | 2/2003 | Tripp et al. |
| 6,519,571 B1 | 2/2003 | Guheen et al. |
| 6,523,021 B1 | 2/2003 | Monberg et al. |
| 6,529,909 B1 | 3/2003 | Bowman-Amuah |
| 6,546,416 B1 | 4/2003 | Kirsch |
| 6,555,738 B2 | 4/2003 | Hughes et al. |
| 6,557,008 B1 | 4/2003 | Temple et al. |
| 6,564,209 B1 | 5/2003 | Dempski et al. |
| 6,567,797 B1 | 5/2003 | Schuetze et al. |
| 6,567,803 B1 | 5/2003 | Ramasamy et al. |
| 6,571,234 B1 | 5/2003 | Knight et al. |
| 6,574,619 B1 | 6/2003 | Reddy et al. |
| 6,578,009 B1 | 6/2003 | Shinozaki |
| 6,581,054 B1 | 6/2003 | Bogrett |
| 6,598,054 B2 | 7/2003 | Schuetze et al. |
| 6,606,644 B1 | 8/2003 | Ford et al. |
| 6,609,124 B2 | 8/2003 | Chow et al. |
| 6,611,839 B1 | 8/2003 | Nwabueze |
| 6,615,184 B1 | 9/2003 | Hicks |
| 6,621,505 B1 | 9/2003 | Beauchamp et al. |
| 6,625,598 B1 | 9/2003 | Kraffert |
| 6,651,048 B1 | 11/2003 | Agrawal et al. |
| 6,651,055 B1 | 11/2003 | Kilmer et al. |
| 6,651,065 B2 | 11/2003 | Brown et al. |
| 6,665,658 B1 | 12/2003 | DaCosta et al. |
| 6,668,259 B1 | 12/2003 | Ventura et al. |
| 6,677,963 B1 | 1/2004 | Mani et al. |
| 6,684,207 B1 | 1/2004 | Greenfield et al. |
| 6,684,218 B1 | 1/2004 | Santos et al. |
| 6,691,105 B1 | 2/2004 | Virdy |
| 6,700,575 B1 | 3/2004 | Bovarnick et al. |
| 6,700,590 B1 | 3/2004 | DeMesa et al. |
| 6,714,979 B1 | 3/2004 | Brandt et al. |
| 6,721,689 B2 | 4/2004 | Markle et al. |
| 6,732,161 B1 | 5/2004 | Hess et al. |
| 6,757,689 B2 | 6/2004 | Battas et al. |
| 6,763,353 B2 | 7/2004 | Li et al. |
| 6,769,009 B1 | 7/2004 | Reisman |
| 6,769,010 B1 | 7/2004 | Knapp et al. |
| 6,772,196 B1 | 8/2004 | Kirsch et al. |
| 6,795,830 B1 | 9/2004 | Banerjee et al. |
| 6,799,221 B1 | 9/2004 | Kenner et al. |
| 6,804,704 B1 | 10/2004 | Bates et al. |
| 6,845,370 B2 | 1/2005 | Burkey et al. |
| 6,868,389 B1 | 3/2005 | Wilkins et al. |
| 6,868,392 B1 | 3/2005 | Ogasawara |
| 6,868,395 B1 | 3/2005 | Szlam et al. |
| 6,920,502 B2 | 7/2005 | Araujo et al. |
| 7,003,517 B1 | 2/2006 | Seibel et al. |
| 7,031,968 B2 | 4/2006 | Kremer et al. |
| 7,039,606 B2 | 5/2006 | Hoffman et al. |
| 7,082,427 B1 | 7/2006 | Seibel et al. |
| 7,096,220 B1 | 8/2006 | Seibel et al. |
| 7,120,629 B1 | 10/2006 | Seibel et al. |
| 2001/0020242 A1 | 9/2001 | Gupta et al. |
| 2001/0032092 A1 | 10/2001 | Calver |
| 2001/0034663 A1 | 10/2001 | Teveler et al. |
| 2001/0042037 A1 | 11/2001 | Kam et al. |
| 2001/0042104 A1 | 11/2001 | Donoho et al. |
| 2001/0052003 A1 | 12/2001 | Seki et al. |
| 2001/0054004 A1 | 12/2001 | Powers |
| 2001/0056366 A1 | 12/2001 | Naismith |
| 2002/0016735 A1 | 2/2002 | Runge et al. |
| 2002/0032603 A1 | 3/2002 | Yeiser |
| 2002/0035501 A1 | 3/2002 | Handel et al. |
| 2002/0035568 A1 | 3/2002 | Benthin et al. |
| 2002/0038299 A1 | 3/2002 | Zernik et al. |
| 2002/0046138 A1 | 4/2002 | Fitzpatrick et al. |
| 2002/0049622 A1 | 4/2002 | Lettich et al. |
| 2002/0072982 A1 | 6/2002 | Barton et al. |
| 2002/0087387 A1 | 7/2002 | Calver et al. |
| 2002/0107701 A1 | 8/2002 | Batty et al. |
| 2002/0116484 A1 | 8/2002 | Podracky |
| 2002/0123957 A1 | 9/2002 | Notarius et al. |
| 2002/0143870 A1 | 10/2002 | Rau |
| 2002/0161685 A1 | 10/2002 | Dwinnell |
| 2002/0178166 A1 | 11/2002 | Hsia |

| | | | |
|---|---|---|---|
| 2003/0028896 A1 | 2/2003 | Swart et al. | |
| 2003/0040845 A1 | 2/2003 | Spool et al. | |
| 2003/0065805 A1 | 4/2003 | Barnes, Jr. | |
| 2003/0083922 A1 | 5/2003 | Reed | |
| 2003/0120502 A1 | 6/2003 | Robb et al. | |
| 2003/0139975 A1 | 7/2003 | Perkowski | |
| 2003/0225736 A1 | 12/2003 | Bakalash et al. | |
| 2004/0002887 A1 | 1/2004 | Fliess et al. | |
| 2005/0021611 A1 | 1/2005 | Knapp et al. | |
| 2005/0044280 A1 | 2/2005 | Reisman | |
| 2005/0137946 A1 | 6/2005 | Schaub et al. | |
| 2006/0013134 A1 | 1/2006 | Neuse | |
| 2006/0015424 A1 | 1/2006 | Esposito et al. | |

FOREIGN PATENT DOCUMENTS

| | | |
|---|---|---|
| EP | 1162558 | 12/2001 |
| WO | WO95/30201 | 11/1995 |
| WO | WO98/21679 | 5/1998 |
| WO | WO98/49641 | 11/1998 |
| WO | WO99/01826 | 1/1999 |
| WO | WO99/66446 | 12/1999 |
| WO | WO 00/23929 | 4/2000 |
| WO | WO 01/22692 | 3/2001 |
| WO | WO 01/77935 | 10/2001 |
| WO | WO 02/01393 | 1/2002 |
| WO | WO 03/104990 | 12/2003 |
| WO | WO 2005/111783 | 11/2005 |
| WO | WO 2006/016350 | 2/2006 |
| WO | WO 2006/020051 | 2/2006 |

OTHER PUBLICATIONS

"Journyx and IBM team to deliver enterprise project and time tracking software"; Journyx press release; Apr. 5, 1999, 3 pages.

Optio software,Inc NEWS: optio software and syntax.net reseller partnership offers a robust solution to provider and deliver customized documents to support e-business and extend the reach of the global enterprise, Dec. 20, 1999, pp. 2.

E. K. Lee; "An enterprise intelligence system integrating WWW and intranet resource"; Proceedings of Research Issues on Data Engineering Information Technology for Virtual Enterprises; Mar. 1999; pp. 28-35.

S. Mathur; "Creating unique customer experience: the new business model of cross-enterprise integration"; IEEE International Conference on Management of Innovation and Technology; 2000; vol. 1; pp. 76-81.

"Enterprise business application architecture"; whitepaper; Beantree; Sep. 1999; pp. 1-5.

Dursun Delen, Perakath C. Benjamin and Madhav Erraguntla; "An integrated toolkit for enterprise modeling and analysis"; Proceedings of the 1999 winter simulation conference, pp. 289-297.

U.S. Appl. No. 09/862,832, entitled "Web-Based Customer Lead Generator System" filed May 21, 2001 by Seibel et al.

Andreas Geyer-Schultz, Michael Hahsler and Maximillian Jahn; "A Customer Purchase Incidence Model Applied to Recommender Services" WebKDD2001 Workshop; Aug. 2001; pp. 1-11.

Ian Watson; "A Case Based Reasoning Application for Engineering Sales Support Using Introspective Reasoning"; American Association for Artificial Intelligence; 2000; pp. 1054-1059.

Nick Elprin and Brian Parno; "An Analysis of Database-Driven Mail Servers"; 2002; pp. 15-22; Harvard University DEAS.

"End Email and File Chaos"; 80-20 Software; 80-20 Retriever Enterprise Edition; 4 pages.

"OASIS Distributed Search Engine," An InsumaGmbH White Paper, pp. 1-11.

David Warlick; "Raw Materials for the Mind: Teaching & Learning in Information & Technology Rich Schools", chapter on Searching the Internet. Mar. 18, 1999.

Pervasive Solution Sheet "Harvesting Unstructured Data", 5 pages, 2003.

Key Building Blocks for Knowledge Mangement Solutions, "IBM Intelligent Miner for Text" 2 pages, 1999.

David Wood; "Metadata Searches of Unstructured Textual Content," Tucana Plugged in Software white Paper, 4 pages, Sep. 26, 2002.

G. Adomavicius and A. Tuzhilin; "Using data mining methods to build customer profiles"; IEEE Computer; Feb. 2001; pp. 74-82; vol. 34, Iss. 2.

Jane Griffin and Kyle Johnstone "Enterprise Customer Relationship Management"; DM review; Dec. 1999; 15 pages.

Olena Parkhomenko, Chintan Patel and Yugyung Lee; "Personalization Using Hybrid Data Mining Approaches in E-Business Applications", FLAIRS Conference, 7 pages, 2004.

Gary M. Weiss; "Data Mining in Telecommunications", 13 pages, no date.

Fionn Murtagh; "Distributed information search and retieval for astronomical resource discovery and data mining"; Library and information services in Astronomy III ASP conference series; 1998; vol. 153; pp. 51-60.

T. Puschmann and R. Alt; "Enterprise application integration-the case of the Robert Bosch Group"; 34th Annual Hawaii International Conference on System Science; Jan. 2001, pp. 1-10.

S. Fong and S. Chan; "Mining online users' access records for web business intelligence", IEEE International Conference on Data Mining; Dec. 2002, pp. 759-762.

M. Kitayama, R. Matsubara and Y. Izui; "Application of data mining to customer profile analysis in the power electric industry"; IEEE Power Engineering Society Winter Meeting; Jan. 2002; pp. 632-634; vol. 1.

P. Markellou, I Mousourouli, S. Sirmakessis and A. Tsakalidis; "Personalized e-commerce recommendations", IEEE Conference on e-Business Engineering; Oct. 2005, pp. 245-252.

Luis Gravano, Hector Garcia-Molina and Anthony Tomasic; "GIOSS: Text-Source Discovery over the Internet"; ACM Transactions on Database Systems; Jun. 1999; pp. 229-264; vol. 24, No. 2.

Michael F. Schwartz and Calton Pu; "Applying an Information Gathering Architecture to Netfind: A White Pages Tool for a Changing and Growing Internet"; IEEE/ACM Transactions on Networking; Oct. 1994; pp. 426-439; vol. 2, No. 5.

Takanori Mouri and Hiroyuki Kitagawa; "Extracting New Topic Contents from Hidden Web Sites"; International Conference on Information Technology: Coding and Computing; Apr. 2004; pp. 314-319; vol. 1.

FIG. 9 iNetProfit     [Back | Home | Log-Off]

Leads Workspace – John Seibel     Total Leads: Email(0), New(5), Open(0), Closed(0)

☑ Assigned(0), 🗐 Copied(0), ▭ Exported(0)

[Check All | Uncheck All]
[Check Range | Uncheck Range]    [☐ to ☐]    [Export | Mark Closed | Reactivate | Delete]
[Show Closed]     [Rank | Categorize]

[Copy To:] 3COM ▼    [Assign To:] bfoster ▼   3com ▼   ☐

Leads 1 – 5 of 5
Page: 1 of 1     [Go To Page] ☐

| | Status | Name | Tel | Company | Search | Category | Date | Rank |
|---|---|---|---|---|---|---|---|---|
| 1. ☐ | New | ALLAN-WN-BAIA ENGELHARDT <allane@cybaea.com> | * | ENGELHARDT, ALL | buy oracle | None | 10/03/01 | 0 |
| 2. ☐ | New | frank <gnij@263.net> | | Not Available | buy oracle | None | 10/03/01 | 0 |
| 3. ☐ | New | Joseph Weinstein <joe@weblogic.com> | 415 | WEBLOGIC, INC | buy oracle | None | 10/03/01 | 0 |
| 4. ☐ | New | Justin Cliff <justin@postgresql.org> | | Not Available | buy oracle | None | 10/03/01 | 0 |
| 5. ☐ | New | Tamilselvan Ramasamy <rtselvan@earthlink.net> | | Not Available | buy oracle | None | 10/03/01 | 0 |

FIG. 11

WEB-BASED CUSTOMER LEAD GENERATOR SYSTEM WITH PRE-EMPTIVE PROFILING

RELATED PATENT APPLICATIONS

This application is a continuation of U.S. patent application Ser. No. 09/970,563, filed Oct. 4, 2001 now U.S. Pat. No. 7,043,531 and entitled "Web-Based Customer Lead Generator System with Pre-Emptive Profiling", which claims the benefit of U.S. Provisional Application No. 60/238,094, filed Oct. 4, 2000 and entitled "Server Log File System Utilizing Text Mining Methodologies and Technologies". The present patent application and additionally the following patent application is a conversion from the foregoing provisional filing: patent application Ser. No. 09/971,334 "Text Mining System for Web-Based Business Intelligence Applied to Web Site Server Logs" and filed Oct. 4, 2001.

This patent application is related to the following pending applications: patent application Ser. No. 09/862,832 entitled "Web-Based Customer Lead Generator System" and filed May 21, 2001; patent application Ser. No. 09/865,802 entitled "Database Server System for Web-Based Business Intelligence" and filed May 24, 2001; patent application Ser. No. 09/865,804 entitled "Data Mining System for Web-Based Business Intelligence" and filed May 24, 2001; patent application Ser. No. 09/865,735 entitled "Text Mining System for Web-Based Business Intelligence" and filed May 24, 2001; patent application Ser. No. 09/862,814 entitled "Web-Based Customer Prospects Harvester System" and filed May 21, 2001; patent application Ser. No. 09/865,805 entitled "Text Indexing System for Web-Based Business Intelligence" and filed May 24, 2001.

TECHNICAL FIELD OF THE INVENTION

This invention relates to electronic commerce, and more particularly to a method of acquiring leads for prospective customers, using Internet data sources.

BACKGROUND OF THE INVENTION

Most small and medium sized companies face similar challenges in developing successful marketing and sales campaigns. These challenges include locating qualified prospects who are making immediate buying decisions. It is desirable to personalize marketing and sales information to match those prospects, and to deliver the marketing and sales information in a timely and compelling manner. Other challenges are to assess current customers to determine which customer profile produces the highest net revenue, then to use those profiles to maximize prospecting results. Further challenges are to monitor the sales cycle for opportunities and inefficiencies, and to relate those findings to net revenue numbers.

Today's corporations are experiencing exponential growth to the extent that the volume and variety of business information collected and accumulated is overwhelming. Further, this information is found in disparate locations and formats. Finally, even if the individual data bases and information sources are successfully tapped, the output and reports may be little more than spreadsheets, pie charts and bar charts that do not directly relate the exposed business intelligence to the companies' processes, expenses, and to its net revenues.

With the growth of the Internet, one trend in developing marketing and sales campaigns is to gather customer information by accessing Internet data sources. Internet data intelligence and data mining products face specific challenges. First, they tend to be designed for use by technicians, and are not flexible or intuitive in their operation; secondly, the technologies behind the various engines are changing rapidly to take advantage of advances in hardware and software; and finally, the results of their harvesting and mining are not typically related to a specific department goals and objectives.

SUMMARY OF THE INVENTION

One aspect of the invention is a web-based computer system for providing, to a business enterprise client, customer lead information from Internet sources. Overall, the system may be described as an application service system, with the programming for the system being accessible to users of the system via web browsers and the Internet. The users are typically business enterprises that maintain e-commerce web sites.

The pre-emptive profiling process accesses the Internet to obtain email addresses of potential web site customers. A harvesting process captures Internet discussions authored by the email addressor. It performs a reverse look-up process to obtain demographic data about each potential customer. This data is then used to provide a purchasing profile of the customer, which is then forwarded to the user of the system. The profile information and the captured conversation may be used for direct sales or for permission-based email opt-in.

Advantages of the invention include its capability of providing permission-based, intelligent prospect lists. A cascading reverse lookup process uses email addresses to find determine contact records. Profile data can be used by e-commerce users to build intelligent dynamic web pages. Industry intelligence, such as technology trends and competitive strengths and weaknesses, can be gathered.

DETAILED DESCRIPTION OF THE INVENTION

Lead Generator System Overview

Figure 1:
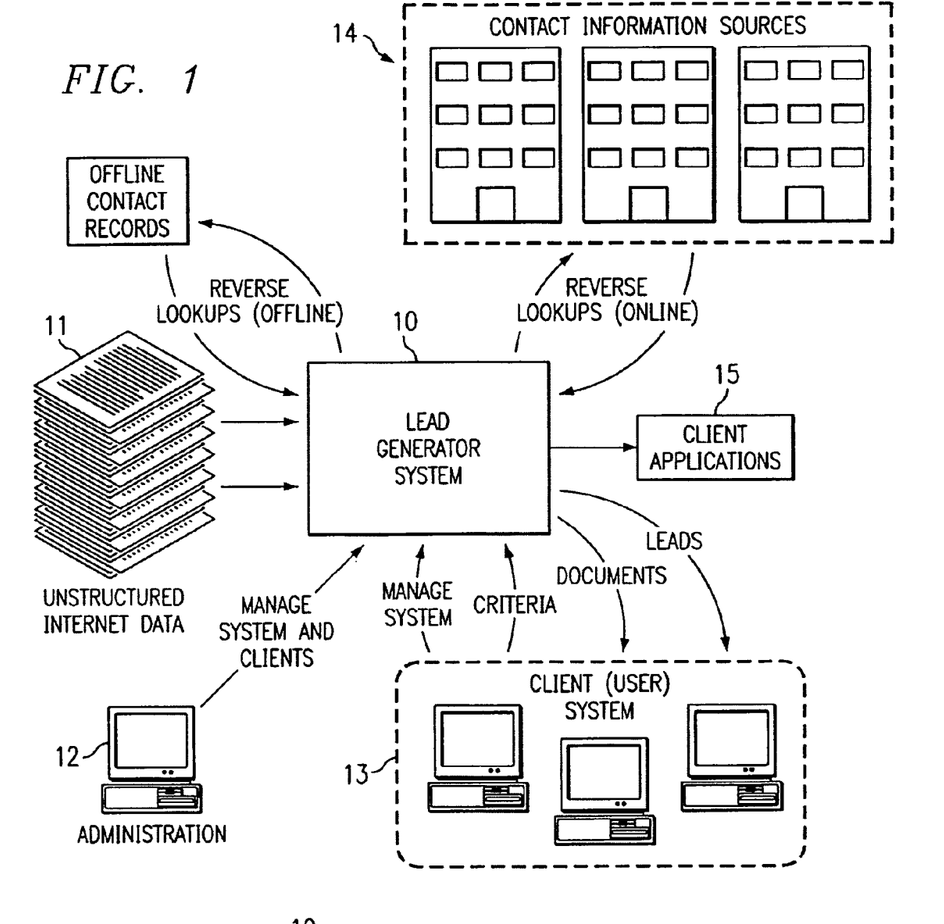
FIG. 1 illustrates the operating environment for a web based lead generator system in accordance with the invention.

FIG. 1 illustrates the operating environment for a web-based customer lead generation system 10 in accordance with the invention. System 10 is in communication, via the Internet, with unstructured data sources 11, an administrator 12, client systems 13, reverse look-up sources 14, and client applications 15.

The users of system 10 may be any business entity that desires to conduct more effective marketing campaigns. These users may be direct marketers who wish to maximizing the effectiveness of direct sales calls, or e-commerce web site who wish to build audiences.

In general, system 10 may be described as a web-based Application Service Provider (ASP) data collection tool. The general purpose of system 10 is to analyze a client's marketing and sales cycle in order to reveal inefficiencies and opportunities, then to relate those discoveries to net revenue estimates. Part of the latter process is proactively harvesting prequalified leads from external and internal data sources. As explained below, system 10 implements an automated process of vertical industry intelligence building that involves automated reverse lookup of contact information using an email address and key phrase highlighting based on business rules and search criteria.

More specifically, system 10 performs the following tasks:
- Uses client-provided criteria to search Internet postings for prospects who are discussing products or services that are related to the client's business offerings
- Selects those prospects matching the client's criteria
- Pushes the harvested prospect contact information to the client, with a link to the original document that verifies the prospects interest
- Automatically opens or generates personalized sales scripts and direct marketing materials that appeal to the prospects' stated or implied interests
- Examines internal sales and marketing materials, and by applying data and text mining analytical tools, generates profiles of the client's most profitable customers
- Cross-references and matches the customer profiles with harvested leads to facilitate more efficient harvesting and sales presentations
- In the audience building environment, requests permission to contact the prospect to offer discounts on services or products that are directly or indirectly related to the conversation topic, or to direct the prospect to a commerce source.

System 10 provides open access to its web site. A firewall (not shown) is used to prevent access to client records and the entire database server. Further details of system security are discussed below in connection with FIG. 5.

Consistent with the ASP architecture of system 10, interactions between client system 13 and system 10 will typically be by means of Internet access, such as by a web portal. Authorized client personnel will be able to create and modify profiles that will be used to search designated web sites and other selected sources for relevant prospects.

Client system 11 may be any computer station or network of computers having data communication to lead generator system 10. Each client system 11 is programmed such that each client has the following capabilities: a master user account and multiple sub user accounts, a user activity log in the system database, the ability to customize and personalize the workspace; configurable, tiered user access; online signup, configuration and modification, sales territory configuration and representation, goals and target establishment, and online reporting comparing goals to target (e.g., expense/revenue; budget/actual).

Administration system 14 performs such tasks as account activation, security administration, performance monitoring and reporting, assignment of master user id and licensing limits (user seats, access, etc.), billing limits and profile, account termination and lockout, and a help system and client communication.

System 10 interfaces with various client applications 15. For example, system 10 may interface with commercially available enterprise resource planning (ERP), sales force automation (SFA), call center, e-commerce, data warehousing, and custom and legacy applications.

Lead Generator System Architecture

Figure 2:
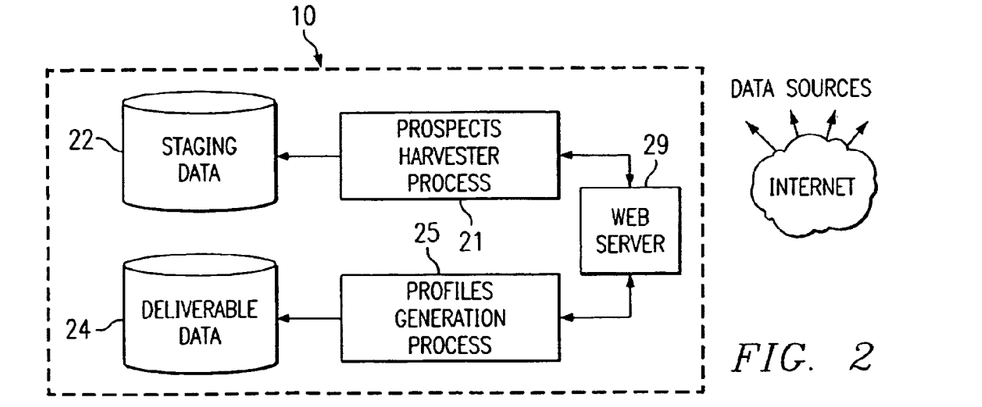
FIG. 2 illustrates the various functional elements of the lead generator system.

FIG. 2 illustrates the various functional elements of lead generator system 10. In the embodiment of FIG. 2, the above described functions of system 10 are partitioned between two distinct processes.

A prospects harvester process 21 uses a combination of external data sources, client internal data sources and user-parameter extraction interfaces, in conjunction with a search, recognition and retrieval system, to harvest contact information from the web and return it to a staging data base 22. In general, process 21 collects business intelligence data from both inside the client's organization and outside the organization. The information collected can be either structured data as in corporate databases/spreadsheet files or unstructured data as in textual files.

Process 21 may be further programmed to validate and enhance the data, utilizing a system of lookup, reverse lookup and comparative methodologies that maximize the value of the contact information. Process 21 may be used to elicit the prospect's permission to be contacted. The prospect's name and email address are linked to and delivered with ancillary information to facilitate both a more efficient sales call and a tailored e-commerce sales process. The related information may include the prospect's email address, Web site address and other contact information. In addition, prospects are linked to timely documents on the Internet that verify and highlight the reason(s) that they are in fact a viable prospect. For example, process 21 may link the contact data, via the Internet, to a related document wherein the contact's comments and questions verify the high level value of the contact to the user of this system (the client).

A profiles generation process 25 analyzes the user's in-house files and records related to the user's existing customers to identify and group those customers into profile categories based on the customer's buying patterns and purchasing volumes. The patterns and purchasing volumes of the existing customers are overlaid on the salient contact information previously harvested to allow the aggregation of the revenue-based leads into prioritized demand generation sets. Process 25 uses an analysis engine and both data and text mining engines to mine a company's internal client records, digital voice records, accounting records, contact management information and other internal files. It creates a profile of the most profitable customers, reveals additional prospecting opportunities, and enables sales cycle improvements. Profiles include items such as purchasing criteria, buying cycles and trends, cross-selling and up-selling opportunities, and effort to expense/revenue correlations. The resulting profiles are then overlaid on the data obtained by process 21 to facilitate more accurate revenue projections and to enhance the sales and marketing process. The client may add certain value judgments (rankings) in a table that is linked to a unique lead id that can subsequently be analyzed by data mining or OLAP analytical tools. The results are stored in the deliverable database 24.

Data Sources

Figure 3:
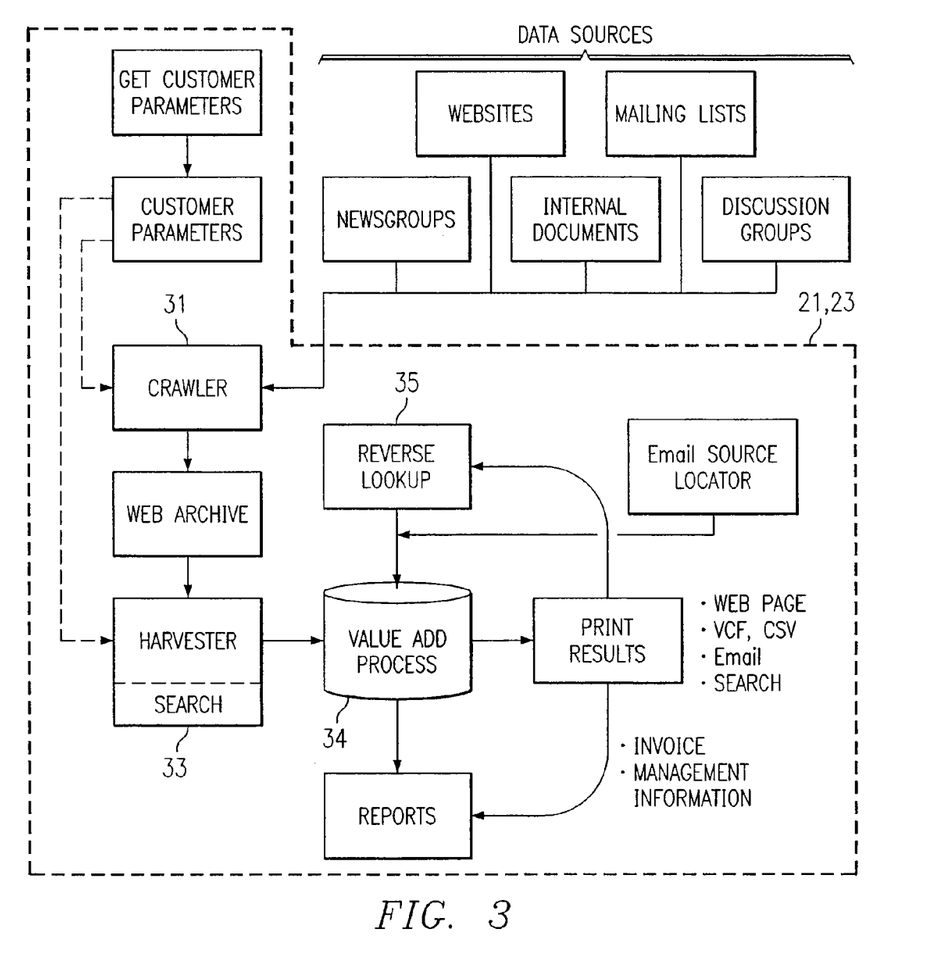
FIG. 3 illustrates a first embodiment of the prospects harvester.

FIG. 3 provides additional detail of the data sources of FIGS. 1 and 2. Access to data sources may be provided by various text mining tools, such as by the crawler process 31 or 41 of FIGS. 3 and 4.

One data source is newsgroups, such as USENET. To access discussion documents from USENET newsgroups such as "news.giganews.com", NNTP protocol is used by the crawler process to talk to USENET news server such as "news.giganews.com." Most of the news servers only archive news articles for a limited period (giganews.com archives news articles for two weeks), it is necessary for the iNet Crawler to incrementally download and archive these newsgroups periodically in a scheduled sequence. This aspect of crawler process 31 is controlled by user-specified parameters such as news server name, IP address, newsgroup name and download frequency, etc.

Another data source is web-Based discussion forums. The crawler process follows the hyper links on a web-based discussion forum, traverse these links to user or design specified depths and subsequently access and retrieve discussion documents. Unless the discussion documents are archived historically on the web site, the crawler process will download and archive a copy for each of the individual documents in a file repository. If the discussion forum is membership-based, the crawler process will act on behalf of the authorized user to logon to the site automatically in order to retrieve documents. This function of the crawler process is controlled by user specified parameters such as a discussion forum's URL, starting page, the number of traversal levels and crawling frequency.

A third data source is Internet-based or facilitated mailing lists wherein individuals send to a centralized location emails that are then viewed and/or responded to by members of a particular group. Once a suitable list has been identified a subscription request is initiated. Once approved, these emails are sent to a mail server where they are downloaded, stored in system 10 and then processed in a fashion similar to documents harvested from other sources. The system stores in a database the filters, original URL and approval information to ensure only authorized messages are actually processed by system 10.

A fourth data source is corporations' internal documents. These internal documents may include sales notes, customer support notes and knowledge base. The crawler process accesses corporations' internal documents from their Intranet through Unix/Windows file system or alternately be able to access their internal documents by riding in the databases through an ODBC connection. If internal documents are password-protected, crawler process 31 acts on behalf of the authorized user to logon to the file systems or databases and be able to subsequently retrieve documents. This function of the crawler process is controlled by user-specified parameters such as directory path and database ODBC path, starting file id and ending file id, and access frequency. Other internal sources are customer information, sales records, accounting records, and call center digital voice records.

A fifth data source is web pages from Internet web sites. This function of the crawler process is similar to the functionality associated with web-discussion-forums. Searches are controlled by user-specified parameters such as web site URL, starting page, the number of traversal levels and crawling frequency.

Prospects Harvesting from External and Internal Data Sources

Referring to FIG. 3, the prospects harvester process 21 of system 10 may be implemented so as to mine data from both internal and external sources.

Crawler process 31 is a background process (hourly, daily or weekly), operating on any of the sources described above. It performs an incremental newsgroup download and an incremental and traversal web page download. It may provide a robust interface with text fields in relational databases. Crawler process 31 operates in response to user input that specifies a particular web site or sites. Once downloaded, the Internet data is stored in a database 32.

Crawler process 31 may also be used for permission-based email. The crawler technology is applied to identify and extract emails. It applies marketing and business rules to generate email text that elicits permission from prospect. It may pass filtered and opt-in emails to client. This process may be automatically generated or generated manually by the client.

A harvester process 33 provides extraction of contact information from database 32, based on search criteria. Additional features are a thesaurus/synonym search, automatic email cleansing (remove standard "no spam" and distracter characters), comprehensive reverse lookup of value-add business information, and keyword-based sales prospects prioritizing.

A value-add process 34 provides robust and mandatory lead ranking and tracking functionality, operating either on-line or off-line. It reports basic customer and prospect profiling (i.e., purchasing criteria, time to purchase, pricing window or sensitivity). It may export and import from/to third party sales management or contact management system. It provides search and sub search based on keywords and business criteria, configurable synonym search (add/delete/modify list of related/similar word searches). It may prioritize leads based on keywords and business criteria. It reports potential revenue projections, user and management reporting of lead tracking (new, open, closed, results). It may perform auto email authoring that incorporates intelligent information from prospect's web document and internal business rules. It may further provide an enhanced document summary that contains a short synopsis of the web-based document's context.

A reverse look-up process 35 implements a cascade, multi-site web search for contact information on email addresses. It may search and parse a document for information, to include vcf-type data. It may use a standard reverse email lookup. It may perform a web site search, when email can be linked to a valid company/business URL. It may further parse an email address into name to be used in online white or yellow pages search. It is an intelligent process that eliminates obvious incorrect contacts. For example, if it is known that the contact is from Texas, eliminate all contacts that are not from that state/location.

Prospects Harvesting from External Data Sources

Figure 4:
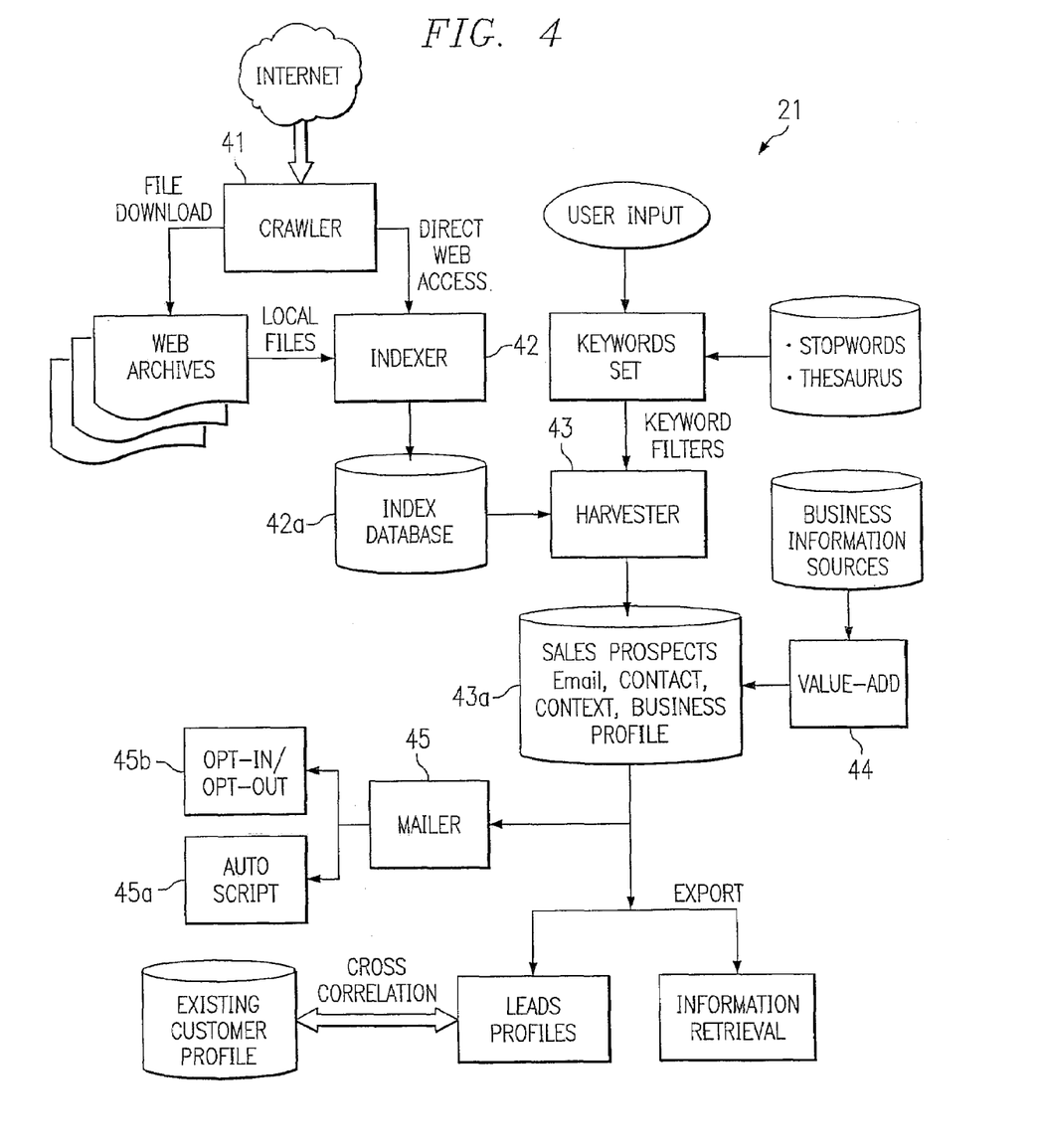
FIG. 4 illustrates a second embodiment of the prospects harvester.

FIG. 4 illustrates another implementation of the prospects harvesting process 21 of FIG. 2.

Crawler process 41 collects information and documents from the Internet. It archives these documents collected from different sources whenever necessary to keep a historical view of the business intelligence.

Indexer 42 indexes the documents retrieved by the crawler 41 and provides the interface for the client to perform searches and sub-searches on specific sets of documents. It also facilitates (1) document keyword highlighting, (2) the extraction of key phrases from documents and (3)

subsequently generates a summary from those documents. ThemeScape, UdmSearch or similar packages may be used to index, search and present documents. Indexer process 42 provides support for multiple file formats such as HTML, DHTML, plain text (ASCII), Word document, RTF and relational database text fields. Indexer process 42 can either interact with crawler process 41 or access web file archives directly to retrieve documents in different formats (such as Text, HTML and Doc formats). These documents are then indexed and categorized with their keywords and/or key phrases, date of creation, a brief summary of the original documents and links to the original documents. Links may be either URLs, file path or a path to a database field. This indexing process will be performed on an ongoing basis as discussion articles and web pages are incrementally downloaded. The results are stored in a central location in the database for future access.

Harvester process 43 queries the index database 42a using user input keywords, default buyer phrases, synonyms related to the keywords and predefined stop words. The end results of this process are a set of documents linked to the original documents with preliminary ranking based on keyword relevance. Harvester process 43 then follows these links to extract an email address, telephone number and other contact information from the original documents, either through file archives or web pages on the Internet. The latter functions are based on a set of keywords and parameters specified by customers. The resulting information is then subsequently indexed and cleansed. These email addresses are then entered into a relational database that is cross-correlated with keywords, source, time stamp, demographics information and company profile information. The harvesting results may be organized and stored into the prospects database 43a with contact information, original document links and preliminary rankings.

A value-add process 44 adds robust business intelligence to the harvesting process by linking sales prospects with comprehensive and updated business profile information (such as industry, company size, company business focus and company purchasing budget). Key aspects of this value-add service is accomplished through partnerships with business information sources, such as Harte-Hanks, Hoovers and Dunn & Bradstreet. Reverse lookups may be performed against these business information sources. Combined with harvested business intelligence, this additional business profile information allows organizations to utilize personalized conversations with prospects, thus dramatically improving their sales close ratios and reducing the time and effort required to close the sale. The overall ranking of a sales prospect is based on the prospect's business profile, and the keyword relevance in harvested documents. Using a ranking algorithm, highly targeted and highly qualified sales/marketing prospects may be identified.

A mailer process 45 provides an auto-scripting utility for sales people to store pieces of their sales scripts in a knowledge base system. Once stored in the knowledge base they can be copied and pasted into a sales correspondence or used by an auto scripting tool 45a to generate sales correspondence on-the-fly based on the discussion context associated with sales leads. The mailer process 45 provides opt-in/opt-out interface 45b to the harvesting database. When the prospects receive a promotion or other sales correspondence, they will be given the choice to opt-in or opt-out from the lead system if they are not interested in receiving further information.

Operational Scenario

Users will typically be sales representatives whose main objective is to quickly identify high quality leads and determine the reason for such qualification and best method to position their product or service for sale. Users will need to have control over an individual profile, login to their lead site, have a personal workspace which functions as their lead home, view leads on the screen and progressively drill down into: (1) contact information, (2) document summary and (3) original document with highlighted key phrases, perform multi-level searches and sub searches into their lead base by looking at all relevant documents in their set, generate scripted emails or print documents that includes business logic and intelligent extract from the original Internet document, close and rank leads based on subjective criteria, view lead performance reports on those leads within their area, rank leads by time to closure or estimated sale value.

A user session might follow these general steps: Login, User completes descriptors, User suggests sources, Launch search, Download, Cleanse, Harvest, Highlight, Cascade lookup, Prioritize prospects (date, time, rank, etc), Push to desktop, Web export.

System Platform

Referring again to FIGS. 1 and 2, the server functions of system 10 may be partitioned among more than one piece of equipment. Standard server equipment may be used, such as those capable of running Windows 2000 server software. Other software used to implement the invention may include Oracle 8i Enterprise Edition, Cold Fusion 4.5 Enterprise for Windows, Verity or Thunderstone for search engine, and Cognos or Seagate products for report generation.

System 10 is based on a client/server architecture. The server of system 10 can reside on Windows NT/2000 Server, Sun Solaris (Unix), and AIX (Unix) architectures. The client may be any web browser that supports Java 1.1 (or higher) plug-in, such as Microsoft IE 4.0 (or higher), or Netscape Communicator 4.0 (or higher). These web browsers run on most major platforms, such as Windows95/98/NT/2000, Unix (Sun Solaris, AIX, Linux, etc), or OS/2 and MacOS.

Pre-Emptive Profiling

Figure 5:
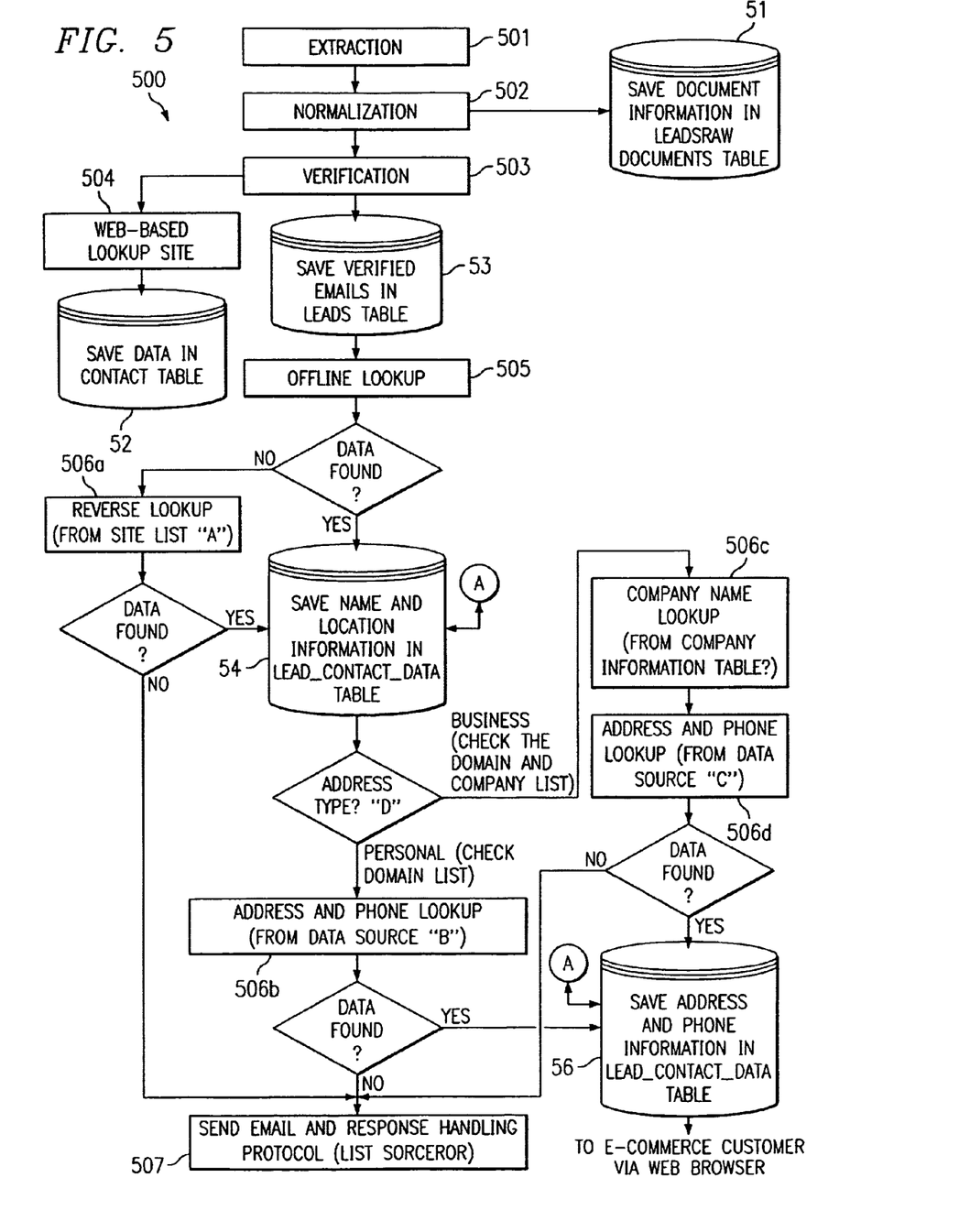
FIG. 5 illustrates a pre-emptive profiling process that may be part of the harvesting engine of FIGS. 2-4.

FIG. 5 illustrates a pre-emptive profiling process that may be part of the harvesting engine 21 of the various systems described above. The source data for this application include sources such as emails, web forums, chat rooms, and other web discussion groups, or any other source from which email addresses are available. The process may be seeded by emails harvested from raw documents that link to sales and marketing information or from raw email lists.

As explained above, a customer-provided query may be used to locate emails containing language indicating that the email author may be a potential buyer. The harvesting locates individuals discussing purchases or problems that can be solved by purchasing an appropriate product or service. For example, harvester 21 could be used to harvest camera forums to find emails asking for information on purchasing a digital camera.

For this application, the profiling system 500 first parses the contents of email correspondence, in Step 501. The parsed data is then normalized and verified in Steps 502 and 503. The normalization Step 502 ensures that email leads are not duplicated. A search for an electronic business card, such as a vcard, may also be performed. In Step 504, a web-based site such as RWhoIs or Internic, may be used to associated a URL with a registrant's identity.

For parsing, Step 501, a relational algorithm may be used to separate the contiguous numbers, consonants, vowels, and diphthongs that comprise an email address. The subcomponents of the parsing are used as search and matching elements that relate the email address to a person or business in a geographical area. The characters following the "@" in the email address are analyzed, using a set of business rules that determine the mail server. Then, the entire email address is pinged to determine validity. After a successful ping, the prefix of characters preceding the "@" is examined, using a software macro that determines the sequence, position, and frequency of numbers, consonants, vowels, and diphthongs.

In Steps 505 and 506a-506d, the parsed contents are analyzed in a manner that permits the overlay of extracted information on a various databases to extrapolate demographic and psychographic information. These databases may be offline or on-line and may include various libraries and thesauruses. This feature may be referred to as a "dynamic intelligent multi-level email lookup" process.

For example, the following is an example of email contents from a forum or discussion group:

"My husband and I want to purchase a digital camera for my 73 year old mother's birthday next month. Is it safe to buy on-line? Where can I get a comparison of cameras for less than $700? What else will she need? sallysmith@hotmail.com.

Using a reverse lookup methodology, Sally's email address is used to find the zip code in which Sally lives. A demographic database search of the zip code records indicates that family income in her zip code exceeds $200,000 annually. The profiler system has a series of electronic libraries, such as for gender, marital status, income, product type, related products, generation, age, etc. Comparing the content of the email to those libraries yields the following:

Sally is married and living with her spouse
(61% on line conversion potential)
Sally is a baby boomer
(48% on line conversion potential)
Sally is new to the Internet
(44% chance of abandoning site)
Sally has disposable income.
Sally is a comparison shopper.
Sally will buy accessories.
Sally probably has a computer.
Sally's mother has a computer.

As illustrated in FIG. 5, in Step 505, the pre-emptive profiling system uses offline data, which it links to email addresses. The process uses a variety of business rules to determine if an email address is likely to be a business or personal address. For example, domain names can be identified as falling into categories for individual, such as news servers, news groups, and discussion forums, or categories that are clearly non-individual business domain names.

In Steps 506a-506d, using this information, an initial path for the lookup is established. To create a contact record, the lookup first visits a first node, and the found information is returned and stored in a database 54. Typically, the first node is for the email user's name, but could also be city, state, or other contact information. The specific data fields now associated with the data record determine the next node to be visited in search of additional information. This process continues until the contact record has all fields completed or until all resources are been exhausted.

The lookup process is continually reviewed to select and prioritize sites. This ensures that the offline database used in Step 505 has complete and accurate information. The sources for the offline lookup 505 may be supplemented by a variety of offline, commercially available sources of contact information, which permit an email address to be associated with an individual or a business entity and contact and marketing information.

FIG. 5 identifies various look-up levels, differentiated in terms of the site lists they access. Examples of Site List A include sites such as InfoSpace, www.555-1212.com, www.411locate.com, and www.aboutcity.com. Examples of Data Source B include sites such as www.databyacxiom.com and white page sites. Examples of Data Source C include sites such as dotcom companies, Master CD, Companies Online, and Hoover's Online. Examples of Data Source D are HotMail, Yahoo, and eGroups.

Figure 6:
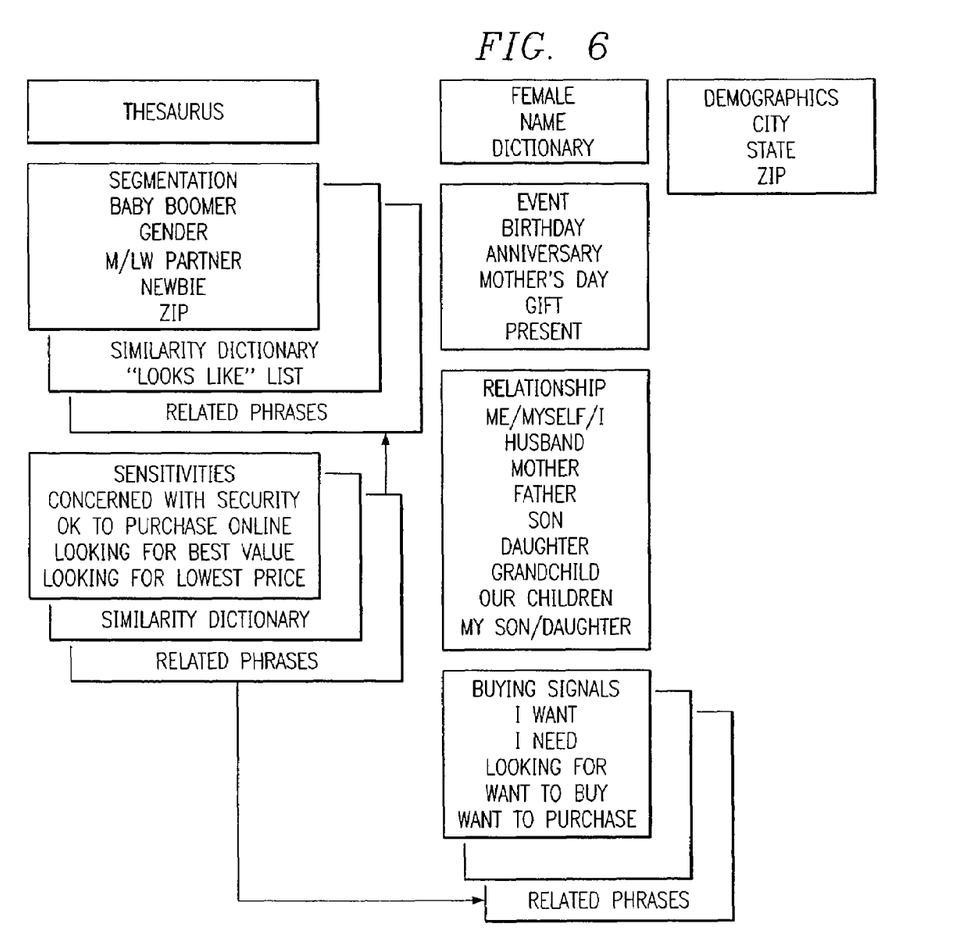
FIG. 6 illustrates various reverse look-up nodes of the pre-emptive profiling process.

FIG. 6 illustrates in further detail, the various nodes of the pre-emptive profiling process. It further illustrates libraries and thesaurus sources that provide various causal factors related to successful transaction rates at e-commerce sites. These include gender, age, marital status, and experience level with Internet purchasing. In addition, the libraries may include general buying interrogatories, such as "for me", "for my", "want to", "need to", as well as key word libraries, for reasons to buy, buying for whom, reason for purchase, family related keywords, demographic fundamentals, and a look for/if then algorithm.

Figure 7:
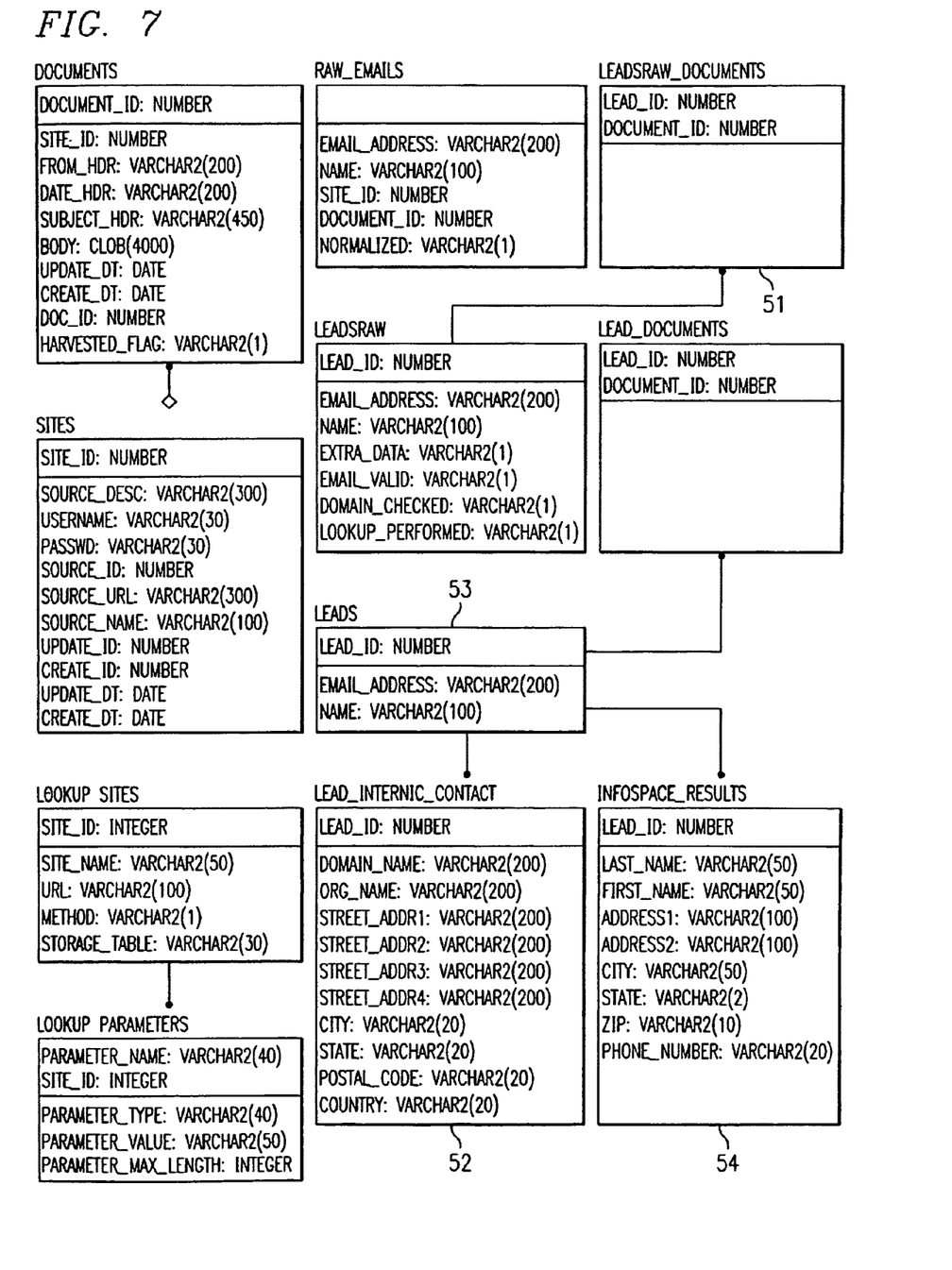
FIG. 7 illustrates the structure of various databases illustrated in FIG. 5.

FIG. 7 illustrates the structure of various databases illustrated in FIG. 5, as well as other data used during the pre-emptive profiling process. Referring to both FIGS. 5 and 7, the normalization step involves associating documents to raw emails to leadsraw documents 51. The verification step 502 involves associating leadsraw data to leadsraw documents 51. The results of the lookup are stored in LeadContact database 54.

After the "pre-emptive profile" information is collected and stored in LeadContact database 54, it is forwarded to an e-commerce web site. Each profile may be further analyzed to produce a mathematical representation may include a probability total of the likelihood that an e-commerce transaction will be completed. The forwarding is typically via the Internet or by other electronic means. The profile data may be accompanied by a link to the original email associated with the potential buyer.

Concurrently, Sally is contacted and given a discount e-coupon. She is directed to the same site, consistent with permission based opt-in contact. Automatic scripting techniques may be used to personalize the email back to Sally.

The pre-emptive profiler permits the site's personalization programming to morph the site to match Sally's profile, and to display several appropriately priced digital cameras. The morphing may be accomplished using various analytic, transaction, and personalization engines that modify the site in a manner that statistically increases the likelihood of the email author's consummating an e-commerce purchase transaction.

The personalization programming at the target web site makes use of known data relevant to conversion and buy-rate. When the buyer is a first time shopper, "conversion" is the first link in the potential buyer's e-commerce experience. Buy rate factors, such as convenience, first purchase experience, online security, and length of experience online, as well as the mechanics of the shopping cart, are all be considered in improving the personalization process. The following are a number of personalization features that can be based on pre-emptive profile information:

First person alert: If the potential buyer is a fist time shopper, the site may be simplified and incentives initiated.
Security level: For first time and low experience users, the web site can be presented with reassurances related to on-line security. The prospect may be offered opportunities for special security features, such as a firewall.

Qualified buyer: Demographic data about the buyer's profile is forwarded to the web site.

Convenience: An item of interest to the buyer may be presented at the fore front with cross selling items presented secondarily.

Length of Experience: The profile data determines the most likely length of experience of the potential buyer. The greater the experience, the more complex and media rich the site can be.

Cycle Feedback: Profile information can be used to provide the buyer with "behind the screen" information. For example, certain delays are know to result in e-commerce transaction drop rates. The buyer can be alerted that their service provider is experiencing high traffic, that their packet is passing through a certain geographic node, or that the service is experiencing difficulty.

Cart saver: The buyer's on line entries can be cached in case of system problems. If a cart pattern falls outside the buyer's profile, the web site can respond to the new profile information.

Retail reporting: Reports for the web site can be generated on the fly.

Profile editor: The buyer can be permitted to view and edit their own profile data.

Prospect generator: Sales, merchandising, and purchase data can be used to generate high targeted customer lists.

Store ticker: A ticker window can be used to monitor sales.

Recommendation generator: A buyer's transactional history and web interactions can be used in conjunction with demographics to provide personalized recommendations.

Content generator: Highly personalized web content can be based on the buyer's transactional history and web interactions.

As an alternative to permission-based opt-in using email back to the potential purchaser, the profile information may be used for direct sales contacting. A sales representative is given a browser-based window into the profile data. The representative selects leads that appear promising, and views or exports them. Automatic scripting may be used to generate a sales script personalized to each lead.

FIGS. 8-11 are screenshots of profile information provided to e-commerce users of the profiling system 500. In these examples, the user interface is via a web browser, connected to the profiling system 500 via the Internet.

Figure 8:
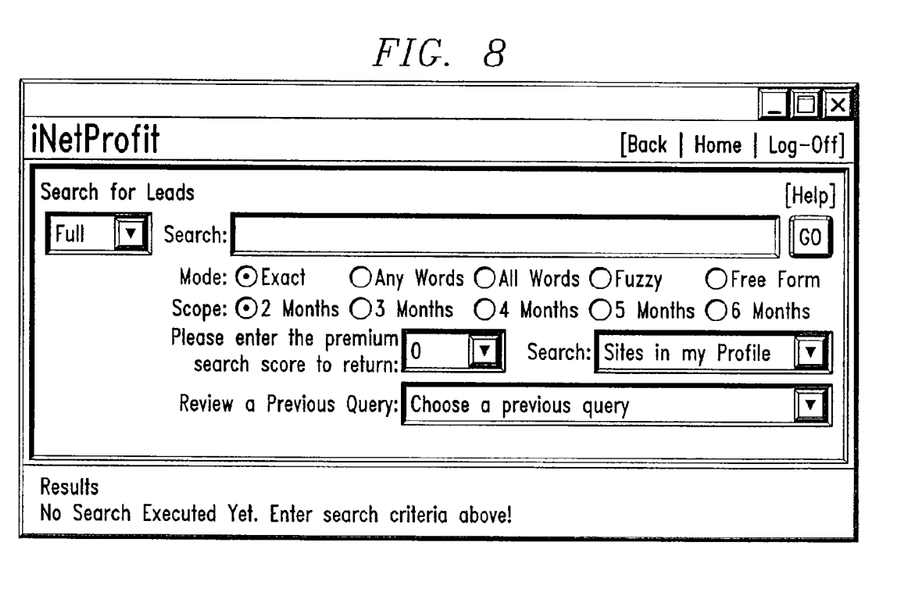
FIGS. 8-11 are screenshots of profiling data provided to an e-commerce user of the profiling system
Figure 9:
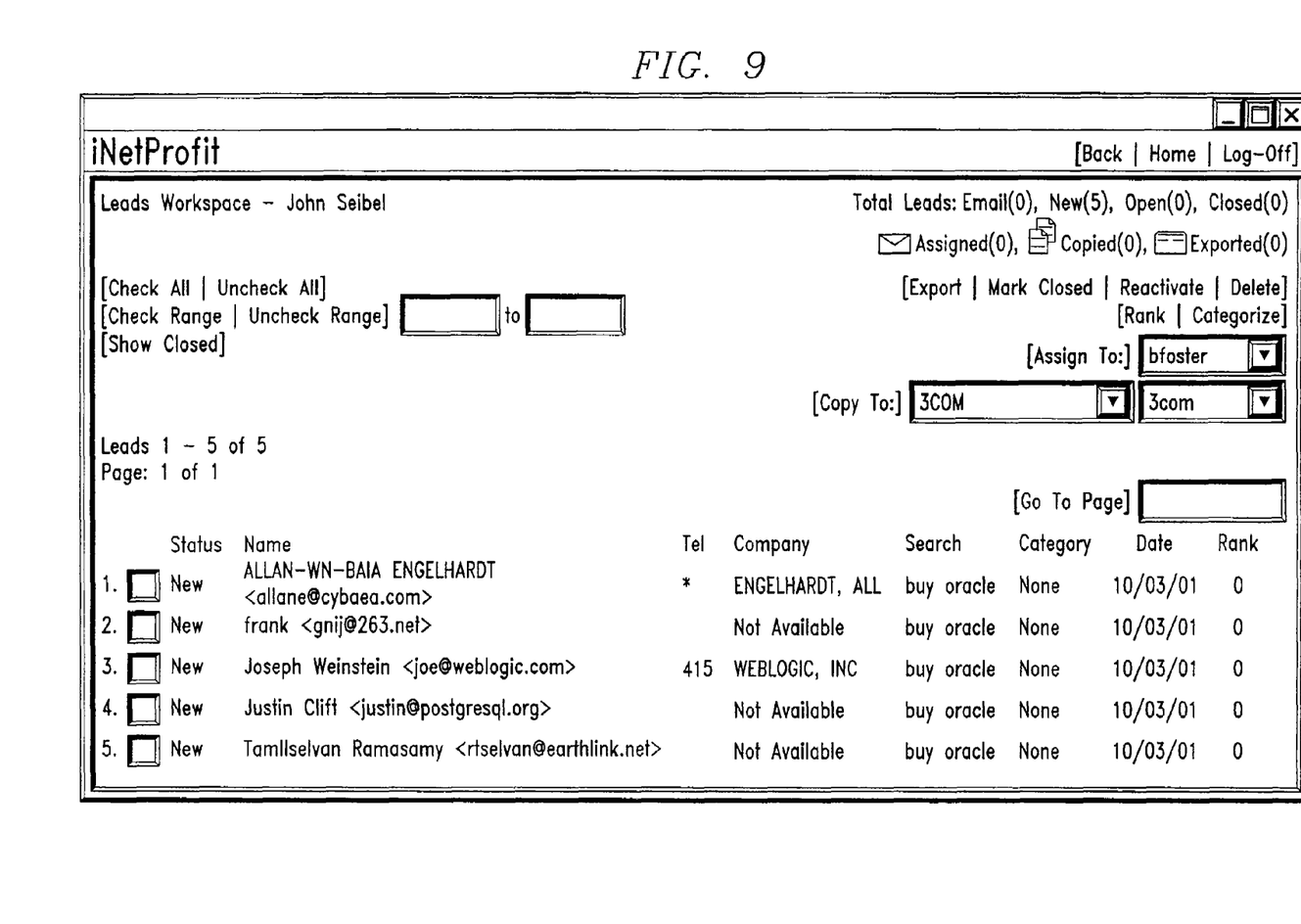
Figure 10:
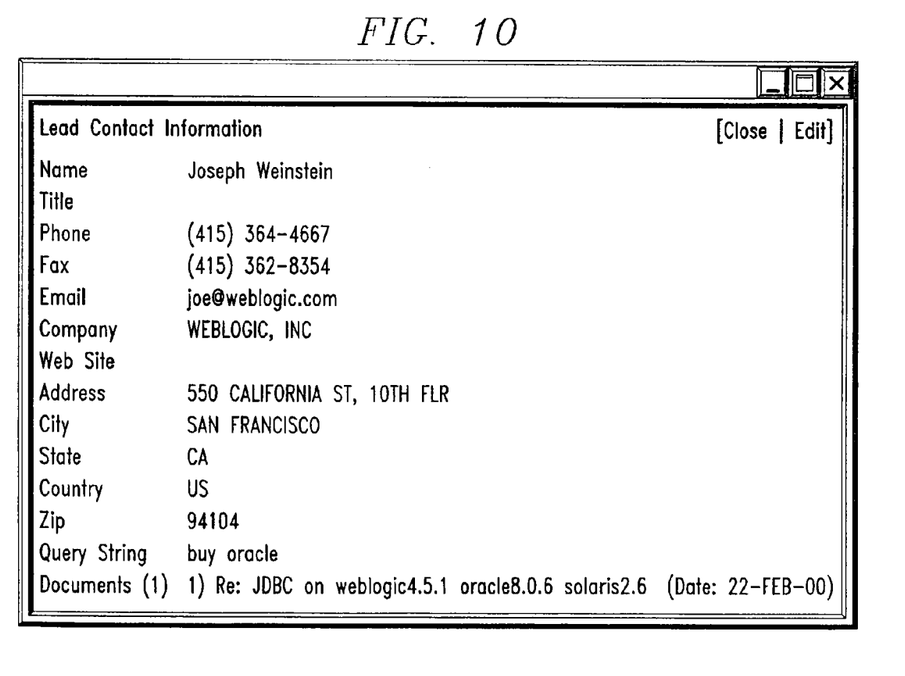
Figure 11:
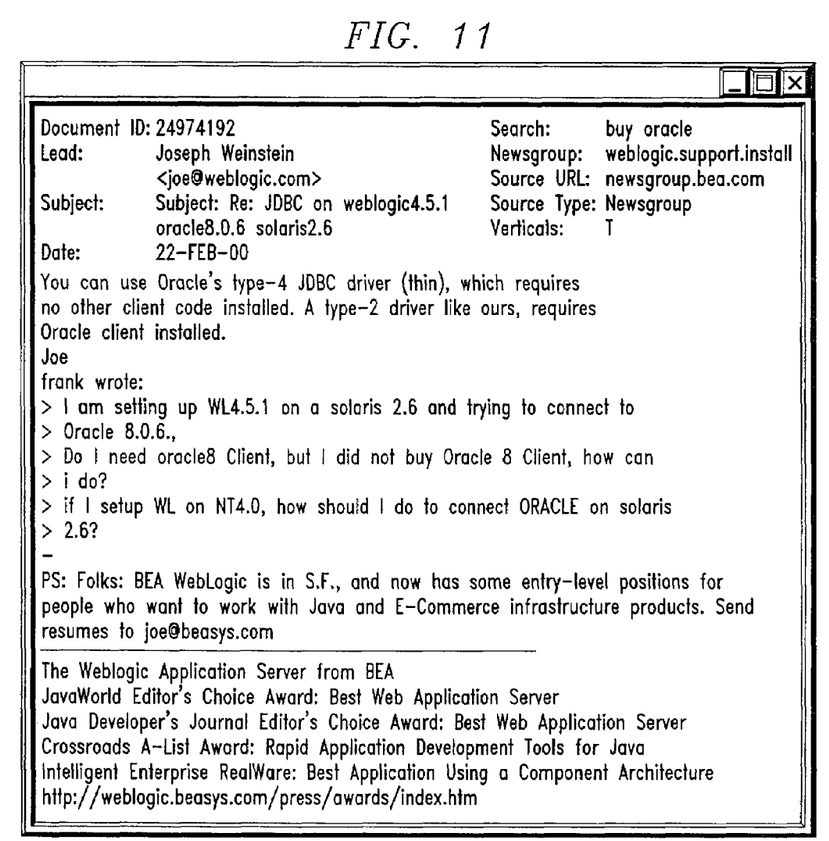

As illustrated in FIG. 8, the user may formulate a search of the type of sources discussed above. As illustrated in FIGS. 8 and 9, in response to the search, the user is provided with a list of email addresses and contact information associated with each. As illustrated in FIG. 11, the user may further be provided with the contents of the original email.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A computer system for providing, to a product/service provider, profile information about prospective customers, comprising:
    a data acquisition process for extracting text documents from unstructured Internet discussion sites;
    wherein the data acquisition process operates by accessing an Internet discussion site independently of, and without activation by the participants of the discussion site;
    wherein each discussion site comprises a collection of text documents generated by participants of the discussion site and simultaneously available to multiple participants of the discussion site;
    an archive database for storing the extracted text documents;
    a harvester for receiving queries from the product/service provider, each query representing a request for information about participants who are discussing a specified product or service;
    wherein the harvester responds to each query by accessing the archive database;
    wherein the harvester is further operable to provide email addresses of the participants who are discussing the product or service; thereby identifying prospective customers;
    a customer profiler operable to use the email addresses to perform reverse look-up to obtain profile data about the prospective customers, and to forward the profile data to the product/service provider; and
    a web server for providing access to the harvester via a web browser and the Internet, such that the product/service provider interacts with the harvester to make the requests on line via the Internet and to receive the outputs generated by the harvester and the profiler.

2. The system of claim 1, wherein the harvester uses a keyword search to obtain the email addresses.

3. The system of claim 1, wherein the profiler is operable to use a parsing algorithm to separate elements of the email address and relates the parsed elements to contact data.

4. The system of claim 1, wherein the profiler is operable to ping the email address to determine validity.

5. The system of claim 1, wherein the profiler performs a multi-level look-up with a data record for each prospective buyer, wherein data fields found at one level of the look-up determine the next level of the look-up.

6. The system of claim 1, wherein the reverse lookup is performed offline.

7. The system of claim 1, wherein the reverse lookup is performed online.

8. The system of claim 1, further comprising a contacter process operable to contact the prospective buyer.

9. The system of claim 8, wherein the contact is performed by autoscripting an email message.

10. The system of claim 1, wherein the profile data includes at least a mathematical representation of transaction success.

11. The system of claim 1, wherein the profiler is further operable to forward a link to a text document authored by the email addressor.

12. The system of claim 1, wherein the profiler is further operable to autoscript a direct sales text based on the profile data.

13. A web-based method for providing, to a product/service provider, profile information about potential customers, comprising:

extracting text documents from at least one unstructured Internet discussion site;

wherein the each discussion site comprises a collection of text documents generated by participants of the discussion site and simultaneously available to multiple participants of the discussion site;

storing the extracted text documents in an archive database;

receiving a query from the product/service provider, via a web browser and a web server, a query representing a request for information about participants of the text sources who are discussing a specified product or service;

using a harvester to access the archive database and to respond to the query independently of, and without activation by the participants;

using the harvester to provide emails addresses of participants who are discussing the specified product or service, thereby identifying prospective customers of the product/service provider; and performing a reverse lookup to obtain additional contact data about the person associated with each email address; and forwarding the profile data to the product/service provider, via a web browser.

14. The method of claim 13, further comprising the steps of parsing the email addresses to separate elements of the email address and of relating the parsed elements to contact data.

15. The method of claim 13, further comprising the step of pinging the email address to determine its validity.

16. The method of claim 13, wherein the reverse lookup is a multi-level look-up, performed by creating a data record for each prospective buyer and using data fields found at one node of the look-up to determine the next node of the look-up.

17. The method of claim 13, wherein the reverse lookup is performed at least partly offline.

18. The method of claim 13, wherein the reverse lookup is performed at least partly online.

19. The method of claim 13, further comprising the step of contacting the prospective customer.

20. The method of claim 19, wherein the contacting is performed by autoscripting an email message.

21. The method of claim 13, wherein the profile data includes at least a mathematical representation of transaction success.

22. The method of claim 13, further comprising the step of forwarding a link to a text document authored by the prospective customer.

23. The method of claim 13, further comprising the step of autoscripting a direct sales text based on the profile data.

* * * * *